(12) United States Patent
Chang et al.

(10) Patent No.: US 9,715,234 B2
(45) Date of Patent: Jul. 25, 2017

(54) MULTIPLE ROTORS AIRCRAFT AND CONTROL METHOD

(71) Applicant: Metal Industries Research & Development Centre, Kaohsiung (TW)

(72) Inventors: Chih-Ming Chang, Kaohsiung (TW); Kuang-Shine Yang, Tainan (TW); Ho-Chung Fu, Kaohsiung (TW); Ying-Cherng Lu, Kaohsiung (TW); Chih-Ming Chiou, Pingtung County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 218 days.

(21) Appl. No.: 14/953,439

(22) Filed: Nov. 30, 2015

(65) Prior Publication Data

US 2017/0153650 A1 Jun. 1, 2017

(51) Int. Cl.
  *G05D 1/08* (2006.01)
  *B64C 27/08* (2006.01)
  *B64C 39/02* (2006.01)

(52) U.S. Cl.
  CPC .......... *G05D 1/0825* (2013.01); *B64C 27/08* (2013.01); *B64C 39/024* (2013.01); *B64C 2201/108* (2013.01)

(58) Field of Classification Search
  CPC ......... G05D 1/08; G05D 1/0825; B64C 27/08
  USPC .................................................. 701/4, 10, 14
  See application file for complete search history.

(56) References Cited

U.S. PATENT DOCUMENTS

| | | | | |
|---|---|---|---|---|
| 2003/0018929 | A1* | 1/2003 | Bardsley | G06F 11/3636 714/39 |
| 2010/0308178 | A1* | 12/2010 | Gemmati | B64C 13/28 244/230 |
| 2012/0072056 | A1* | 3/2012 | Hasan | B64C 13/00 701/3 |
| 2016/0348533 | A1* | 12/2016 | Ficklscherer | F02C 9/26 |

FOREIGN PATENT DOCUMENTS

| TW | 573293 | 1/2004 |
|---|---|---|
| TW | I290633 | 12/2007 |
| TW | I463284 | 12/2014 |

\* cited by examiner

*Primary Examiner* — Tan Q Nguyen
(74) *Attorney, Agent, or Firm* — Jianq Chyun IP Office

(57) ABSTRACT

A multiple rotors aircraft and a control method thereof are provided. The control method comprises the following steps. First, current motion information of the multiple rotors aircraft is obtained. Then, at least one control gain is adjusted through a gain adjustment function according to the current motion information. The gain adjustment function conforms to a non-Lipschitzian characteristic, and at least one rotor of the multiple rotors aircraft is controlled according to the control gain. Therefore, the multiple rotors aircraft would be ensured that its flight attitude is toward a target position, and the expected result would be conformed rapidly.

11 Claims, 5 Drawing Sheets

MULTIPLE ROTORS AIRCRAFT AND CONTROL METHOD

BACKGROUND OF THE INVENTION

Field of the Invention

The invention relates to a control method of an aircraft, and particularly relates to a multiple rotors aircraft based on a non-Lipschitzian characteristic and a control method thereof.

Description of Related Art

Along with quick development of technology, development cost of unmanned aerial vehicles (UAV) (which are also referred to as unmanned aircraft systems (UAS), etc.) originally applied in military field is also decreased, and various electronic companies actively involve in the UAV market. Regarding applications of good and food delivery and sports photography, the electronic companies try to implement the above applications through the UAVs recently. The UAV market is expected to bring a lot of job opportunities, and its economic output is limitless.

On the other hand, most of the UAVs on the market adopt a design of multiple rotors aircraft. The multiple rotors aircraft has characteristics of high mobility, simple design, high security, etc., and is adapted to carry on operations in surveillance, reconnaissance, exploration, transportation, etc., in near ground environment. Generally, a change in a flight attitude of the aircraft may cause a change in a flight direction of the aircraft, so as to change a direction and a magnitude of a thrust force. However, most of the current multiple rotors aircrafts have characteristics of high nonlinearity and coupling, which brings a great challenge in design of a system controller, and parameter uncertainty causes a log of influences on a dynamic behavior of the multiple rotors aircraft.

SUMMARY OF THE INVENTION

The invention is directed to a multiple rotors aircraft and a control method thereof, in which control gains for driving rotors in the multiple rotor aircraft are adjusted based on a convergence property of differential equations, so as to achieve fast, stable and robust effects.

The invention provides a control method, which is adapted to a multiple rotors aircraft, and includes following steps. Current motion information of the multiple rotors aircraft is obtained. Then, at least one control gain is adjusted through a gain adjustment function according to the current motion information, so as to control at least one rotor of the multiple rotors aircraft according to the control gain. The gain adjustment function conforms to a non-Lipschitzian characteristic.

In an embodiment of the invention, after the step of adjusting the at least one control gain through the gain adjustment function according to the current motion information, the method further includes adjusting a target attitude parameter through an attitude estimation function according to the current motion information and the control gain, where the attitude estimation function is $$\theta_d = \frac{1}{\tilde{U}_1}(-K_x S_x + \ddot{x}_d - k_x \dot{e}_x - |h_x| S_x),$$

$$\phi_d = \frac{1}{\tilde{U}_1}(-K_y S_y + \ddot{y}_d - k_y \dot{e}_y - |h_y| S_y).$$

In an embodiment of the invention, before the step of adjusting the at least one control gain through the gain adjustment function according to the current motion information, the method further includes defining an error function, where the error function is $$\dot{S}_\xi = \tilde{U}_1 b m^{-1} \begin{bmatrix} \theta_d + \tilde{H}_x \\ \phi_d + \tilde{H}_y \\ \cos\theta\cos\phi \end{bmatrix} + \begin{bmatrix} -\ddot{x}_d + k_x \dot{e}_x \\ -\ddot{y}_d + k_y \dot{e}_y \\ -\ddot{z}_d + k_z \dot{e}_z \end{bmatrix} + \begin{bmatrix} 0 \\ 0 \\ -g \end{bmatrix},$$

b is a length constant, and the error function conforms to the non-Lipschitzian characteristic.

In an embodiment of the invention, the current motion information further includes a current position, the step of obtaining the current motion information of the multiple rotors aircraft includes obtaining the current position, a current pitch angle, a current yaw angle and a current roll angle through at least one inertial navigation element.

According to another aspect, the invention provides a multiple rotors aircraft, which includes at least one rotor, at least one inertial navigation element and a processing unit. The rotors are respectively controlled by at least one control gain. The inertial navigation element is configured to obtain current motion information of the multiple rotors aircraft. The processing unit is coupled to the rotors and the inertial navigation element, and obtains the current motion information of the multiple rotors aircraft through the inertial navigation element, and adjusts the at least one control gain through a gain adjustment function according to the current motion information. The gain adjustment function conforms to a non-Lipschitzian characteristic.

In an embodiment of the invention, the non-Lipschitzian characteristic represents that a convergence value of a function is only zero, and the convergence value is not varied after being converged to zero.

In an embodiment of the invention, the current motion information includes a current pitch angle, a current yaw angle and a current roll angle, and the gain $h_x = -h_x^{(1/2n+1)}$ [$\tilde{U}_1(-\theta_d + \cos\psi \sin\theta \cos\phi + \sin\psi \sin\phi)S_x$] adjustment function is $h_y = -h_y^{(1/2n+1)}$[$\tilde{U}_1(-\phi_d + \sin\psi \sin\theta \cos\phi - \cos\psi \sin\phi)S_y$], where $$h_i = \begin{cases} -h_i^{\left(\frac{1}{2n+1}\right)}\Theta_i, & h_i \neq 0, i = x, y \\ \sigma, & h_i = 0 \end{cases}$$

$h_x$, $h_y$ are control gains, $$\tilde{U}_1 = \frac{1}{\cos\theta\cos\phi}(g + \ddot{z}_d - k_z \dot{e}_z - K_z S_z) \forall |\theta| < \frac{\pi}{2}, |\phi| < \frac{\pi}{2}, , \theta_d$$

is a target pitch angle in a target attitude parameter, $\phi_d$ is a target yaw angle in the target attitude parameter, $\psi$ is the current roll angle, $\theta$ is the current pitch angel, $\phi$ is the current yaw angle, $S_x = \dot{e}_x + k_x e_x$, $e_x = x - x_d$, $S_y = \dot{e}_y + k_y e_y$, $e_y = x - x_d$, $S_z = \dot{e}_z + k_z e_z$, $e_z = z - z_d$, (x,y,z) is a current position, $(x_d, y_d, z_d)$ is a target position, $k_x$, $k_y$, and $k_z$ are control coefficients, $K_z$ is an aerodynamic damping coefficient, n is hierarchy, g is the acceleration of gravity, $\Theta_i = \tilde{U}_1 \tilde{H}_i S_i$, $\tilde{H}_x = -\theta_d + \cos\psi \sin\theta \cos\phi + \sin\psi \sin\phi$, $\tilde{H}_y = -\phi_d + \sin\psi \sin\theta \cos\phi - \cos\psi \sin\phi$, and $\sigma$ is a micro constant.

In an embodiment of the invention, the processing unit adjusts the target attitude parameters through an attitude estimation function according to the current motion information and the control gain, where the attitude estimation function is $$\theta_d = \frac{1}{\tilde{U}_1}(-K_x S_x + \ddot{x}_d - k_x \dot{e}_x - |h_x| S_x),$$

$$\phi_d = \frac{1}{\tilde{U}_1}(-K_y S_y + \ddot{y}_d - k_y \dot{e}_y - |h_y| S_y).$$

In an embodiment of the invention, the processing unit defines an error function, where the error function is $$\dot{S}_\xi = \tilde{U}_1 b m^{-1} \begin{bmatrix} \theta_d + \tilde{H}_x \\ \phi_d + \tilde{H}_y \\ \cos\theta\cos\phi \end{bmatrix} + \begin{bmatrix} -\ddot{x}_d + k_x \dot{e}_x \\ -\ddot{y}_d + k_y \dot{e}_y \\ -\ddot{z}_d + k_z \dot{e}_z \end{bmatrix} + \begin{bmatrix} 0 \\ 0 \\ -g \end{bmatrix},$$

b is a length constant, and the error function conforms to the non-Lipschitzian characteristic.

According to the above descriptions, in the multiple rotors aircraft and the control method thereof provided by the invention, the error function, the gain adjustment functions and the attitude estimation functions are determined according to the non-Lipschitzian characteristic, so as to adjust the control gains used for driving the rotors and the target attitude parameters. In this way, the embodiment of the invention may accurately control the multiple rotors aircraft to reach a target position, so as to provide a robust adaptive control system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In conditions of stability analysis of conventional differential equations, it is known that exponential solutions are convergent. A multiple rotors aircraft and a control method thereof provided by the embodiments of the invention are adapted to quickly estimate an actual state (for example, a flight attitude) through specific differential equations, so as to achieve a quick convergence effect. Moreover, through stability analysis, stability of the system is proved. A plurality of embodiment complying with the spirit of the invention is provided below, and users may suitably adjust the embodiments according to an actual requirement without being limited to the following described content.

Figure 1:
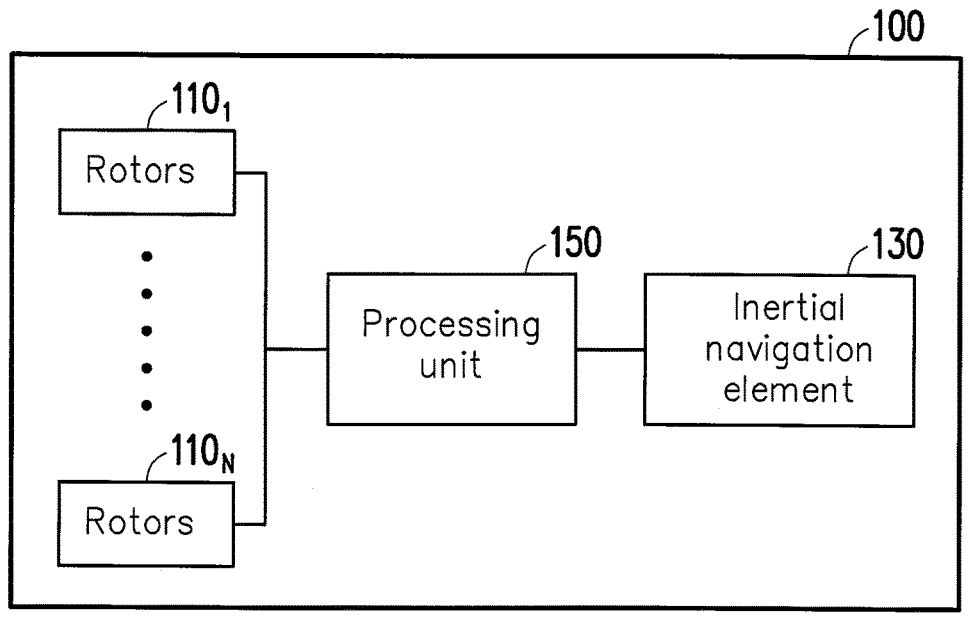
FIG. 1 is a component block diagram of a multiple rotors aircraft according to an embodiment of the invention.

FIG. 1 is a component block diagram of a multiple rotors aircraft according to an embodiment of the invention. Referring to FIG. 1, the multiple rotors aircraft 100 includes at least one set of rotors $110_1$-$110_N$, at least one inertial navigation element 130 and a processing unit 150, where N is a positive integer (for example, 4, 6, 8, etc.). The multiple rotors aircraft 100 can be multirotor aircraft of any driving types, which is not limited by the invention.

Each of the rotors $110_1$-$110_N$ may at least include (but not limited to) components of blades, a blade hub, propellers, a torque arm, a rotor shaft, etc. The rotors $110_1$-$110_N$ are respectively driven by a control gain, and the multiple rotors aircraft 100 may accordingly implement operations of hovering, maintaining attitude, levelling off, etc. Based on a different number of the rotors $110_1$-$110_N$, the multiple rotors aircraft 100 may have a different term (for example, a quacioter, a hexacopter, an oetocopter, etc.), and the number of the rotors $110_1$-$110_N$ is not limited by the invention.

The inertial navigation element 130 (or an inertial measurement unit (IMU)) includes an accelerometer, a gyro sensor, an E-compass, a G-sensor, a geomagnetic sensor, etc., and is configured to obtain current motion information (for example, a current position, a current pitch angle, a current yaw angle, a current roll angle, etc.) of the multiple rotors aircraft 100. It should be noted that according to a different design requirement, the multiple rotors aircraft 100 may also include a satellite navigation system such as a global positioning system (GPS), an assisted global positioning system (AGPS), a Galileo positioning system or a global navigation satellite system (GLONASS), etc., to assist obtaining position of geodesic coordinates (or geographical position).

The processing unit 150 is coupled to the rotors $110_1$-$110_N$ and the inertial navigation element 130, and is a central processing unit (CPU), or other programmable general purpose or special purpose microprocessor, a digital signal processor (DSP), a programmable controller, an application specific integrated circuit (ASIC) or other similar devices or a combination of the above devices. In the present embodiment, the processing unit 150 is configured to execute all of operations of the multiple rotors aircraft 100. For example, the processing unit 150 has a proportional-integral-differential (PID) controller, which controls rotation speeds of the rotors $110_1$-$110_N$ based on the control gain, and adjusts the control gains and a flight attitude, etc., according to a control method of the invention, which is described in detail later.

It should be noted that according to a different design requirement, the multiple rotors aircraft 100 may further include a motor (for example, a brushless direct current (BLDC) motor, an electric motor, a frame, a bracket, a power module, etc., and appearances, configuration positions and sizes of the above components are not limited by the invention.

Figure 2:
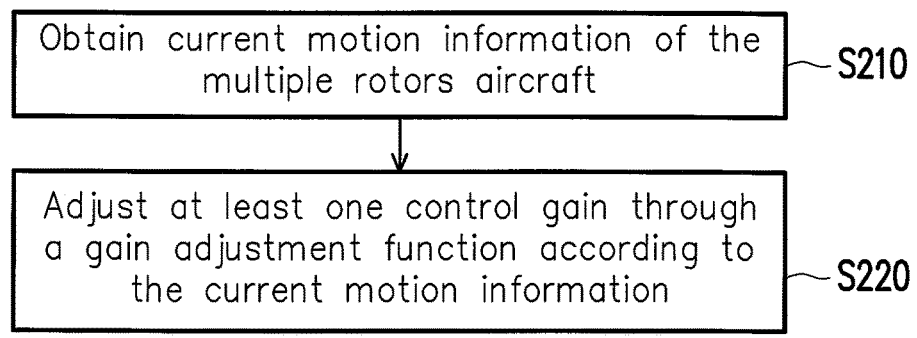
FIG. 2 is a flowchart illustrating a control method according to an embodiment of the invention.

In order to facilitate understanding of an operation flow of the invention, a plurality of embodiments is provided below to describe a control method of the multiple rotors aircraft 100 of the invention in detail. FIG. 2 is a flowchart illustrating a control method according to an embodiment of the invention. Referring to FIG. 2, the control method of the present embodiment is adapted to the multiple rotors aircraft 100 of FIG. 1. In the following description, the control method of the present embodiment is described with reference of various components and modules of the multiple rotors aircraft 100. The flow of the control method can be adjusted according to an actual requirement, and is not limited to the following implementation.

Figure 3A:
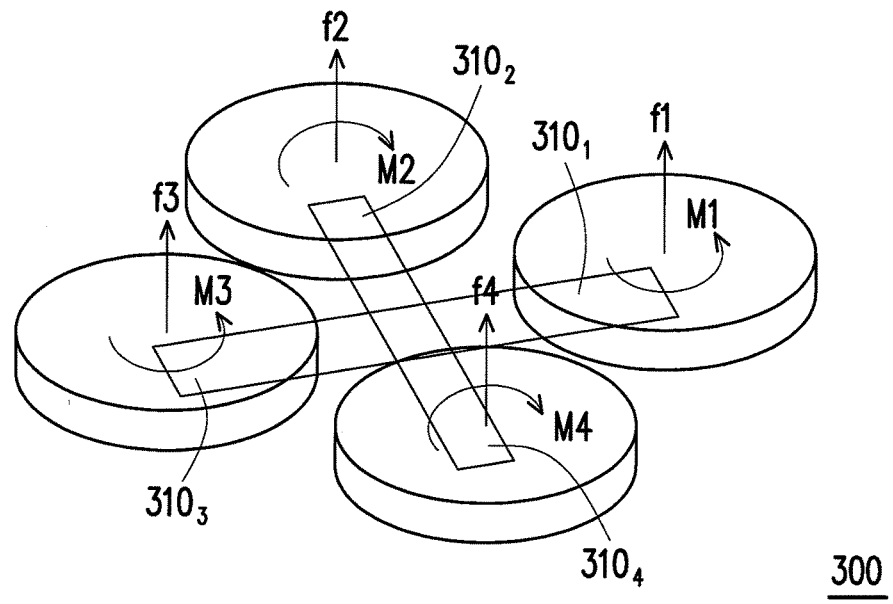
FIG. 3A is a schematic diagram of a four-rotor aircraft according to an embodiment of the invention.

In step S210, the processing unit 150 obtains current motion information of the multiple rotors aircraft 100 through the inertial navigation element 130. In the present embodiment, the current motion information of the multiple rotors aircraft 100 includes a current pitch angle φ, a current yaw angle θ, a current roll angle ψ (or referred to as an Euler angle coefficient in a rotation sequence $E_y$-$E_z$-$E_x$) and a current position. To be specific, in order to further understand the flight attitude of the multiple rotors aircraft 100, a dynamic model of a four-rotor aircraft is taken as an example for preliminary derivation. FIG. 3A is a schematic diagram of a four-rotor aircraft according to an embodiment of the invention. The four-rotor aircraft 300 has components that are the same or similar to that of the multiple rotors aircraft 100 of FIG. 1, and detailed descriptions of the components are not repeated. Referring to a coordinate schematic diagram of FIG. 3B, the coordinate definition of the four-rotor aircraft 300 can be represented as follows: $q=(x,y,z,\phi,\theta,\psi)\in R^6$, where $(x,y,z)$ represents the current position of a center of the four-rotor aircraft 300 relative to the geodesic coordinates (or geographical coordinates), and (φ, θ, ψ) are three rotation angles (i.e. the current pitch angle φ, the current yaw angle θ and the current roll angle ψ) used for describing the flight attitude of the four-rotor aircraft 300.

Figure 3B:
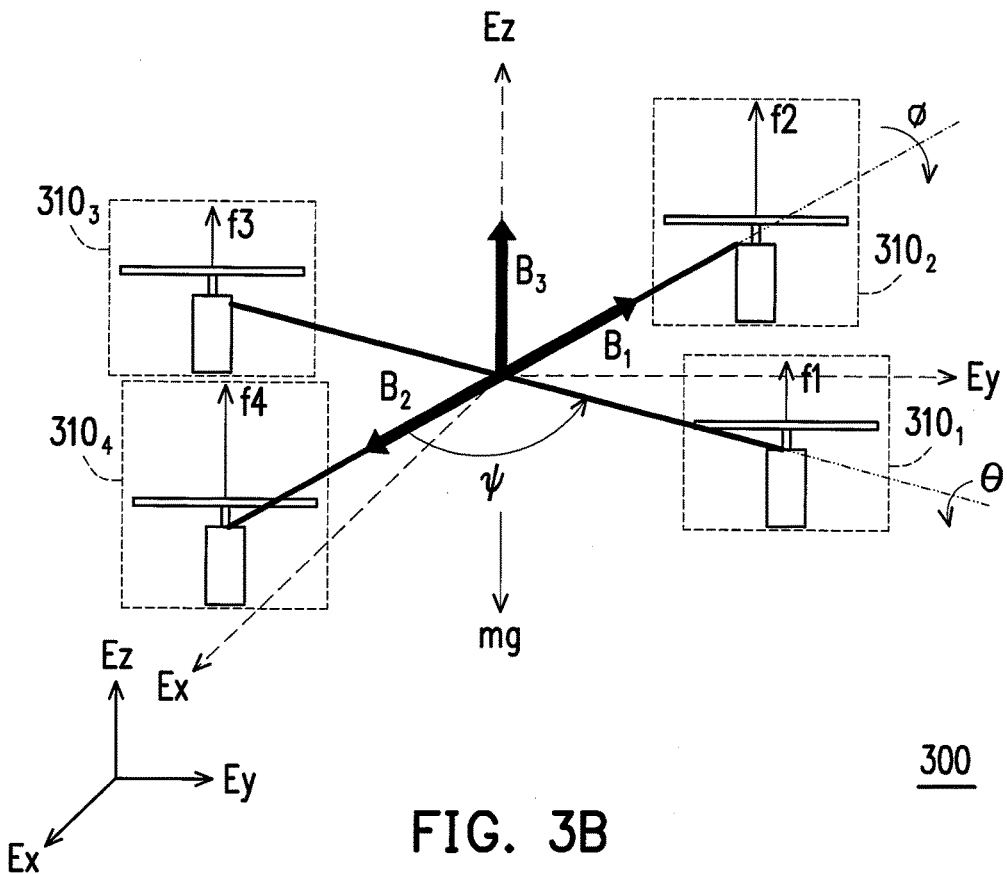
FIG. 3B is a coordinate schematic diagram.
Figure 4A:
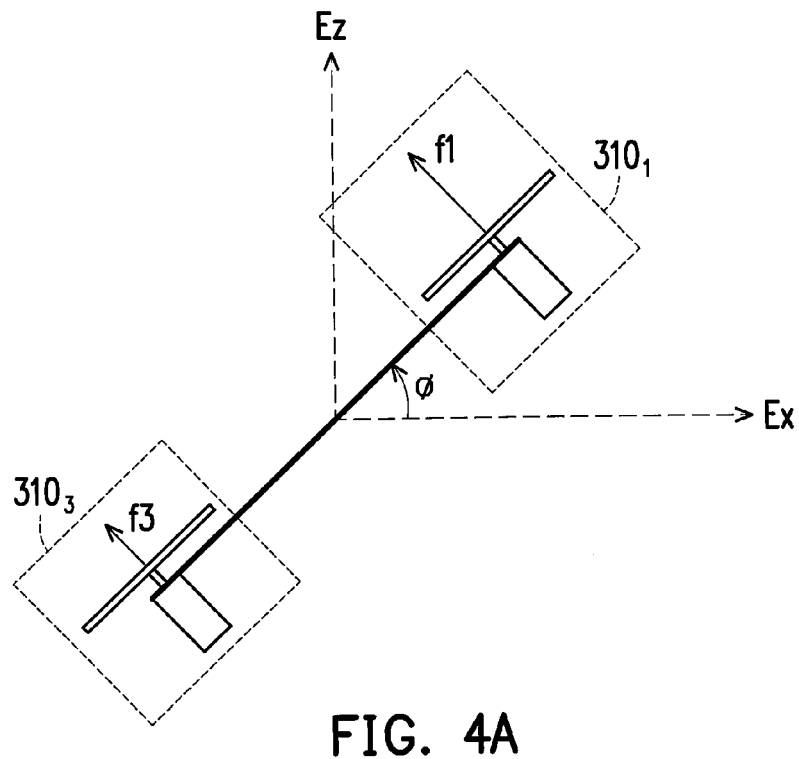
FIG. 4A-FIG. 4C are respectively schematic diagrams of a current pitch angle, a current yaw angle and a current roll angle.
Figure 4B:
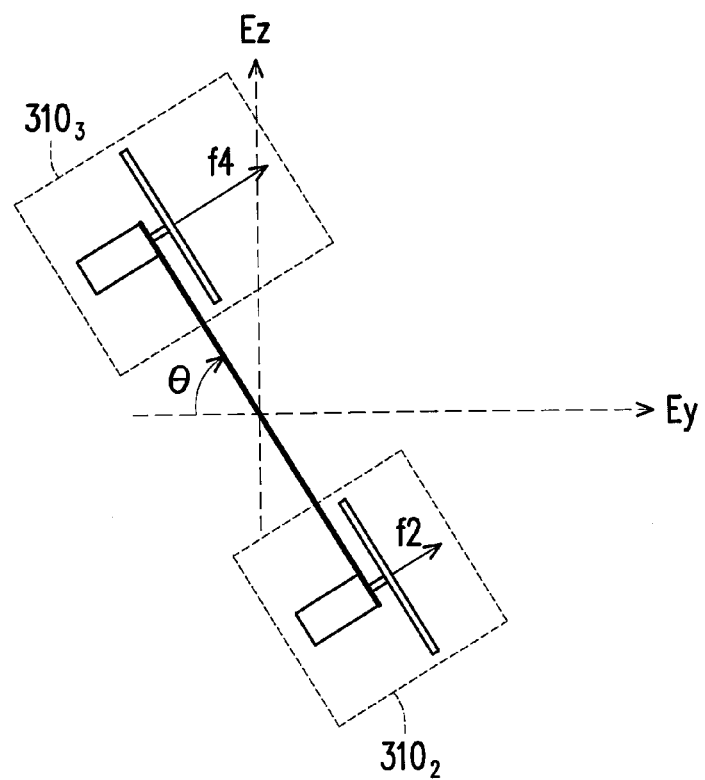
Figure 4C:
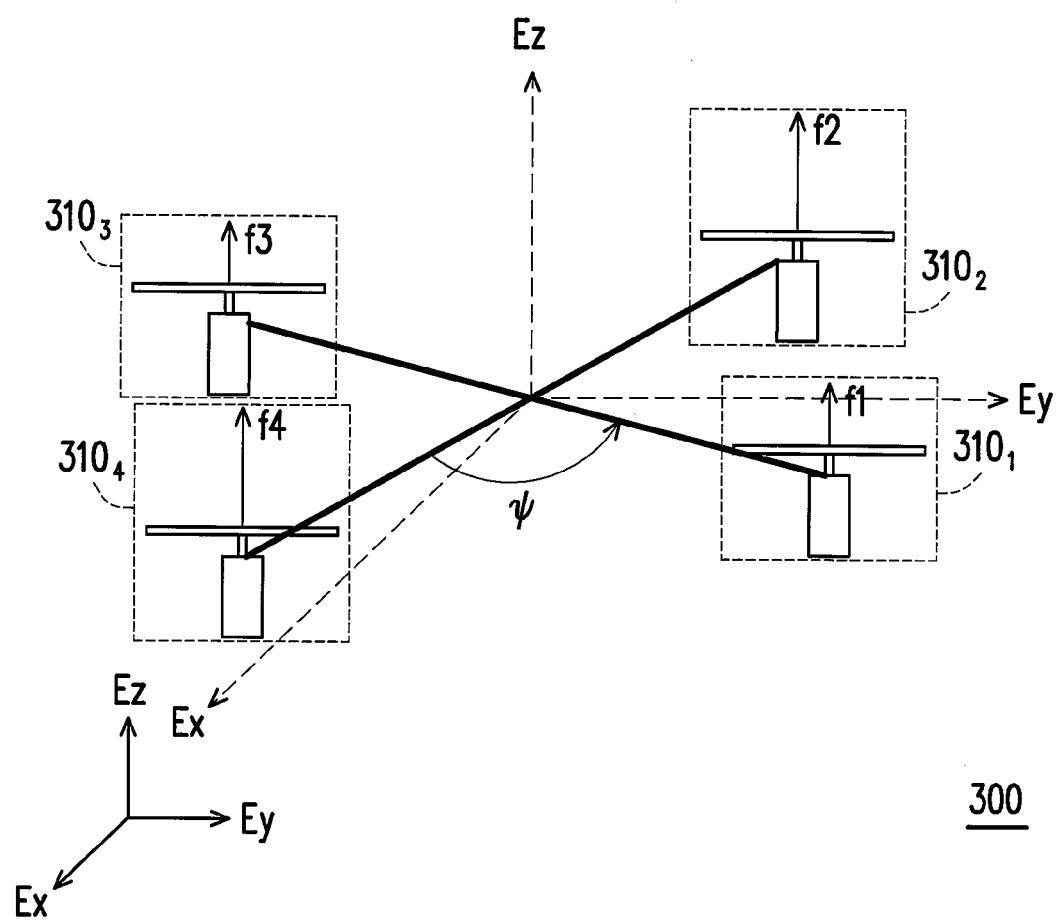

FIG. 4A-FIG. 4C are respectively schematic diagrams of the current pitch angle φ, the current yaw angle θ and the current roll angle ψ. Referring to FIG. 3B and FIG. 4A, taking the geodesic coordinates ($E_x$-$E_y$-$E_z$) as a basis, an included angle between an $E_x$ axis and a connection line of the rotors $310_1$ and $310_3$ towards an $E_z$ axis direction is defined as the current pitch angle φ. Referring to FIG. 3B and FIG. 4B, taking the geodesic coordinates ($E_x$-$E_y$-$E_z$) as the basis, an included angle between an $E_y$ axis and a connection line of the rotors $310_2$ and $310_4$ towards the $E_z$ axis direction is defined as the current yaw angle θ. Referring to FIG. 3B and FIG. 4C, an included angle between the rotors $310_1$ and $310_4$ is defined as the current roll angle ψ.

The processing unit 150, for example, obtains sensing information (for example, an azimuth angle, an acceleration, a speed, a displacement, etc.) through the inertial navigation element 130 such as a gyro sensor, an accelerometer, an E-compass, etc., and calculates the current position and the current pitch angle φ, the current yaw angle θ and the current roll angle ψ according to the sensing information.

Moreover, a basic principle of navigation is to ensure correct transformation of two coordinate systems (i.e. on-vehicle coordinates and the geodesic coordinates). Then, referring to FIG. 3B, $B=\{B_1, B_2, B_3\}$ is defined as the on-vehicle coordinates, and the on-vehicle coordinates can be transformed into the geodesic coordinates through a following transformation matrix $R_E$:

$$R_E = \begin{bmatrix} \cos\theta\cos\psi & \sin\psi\sin\theta & -\sin\theta \\ \cos\psi\sin\theta\sin\phi & \sin\psi\sin\theta\sin\phi + \cos\psi\cos\phi & \cos\theta\cos\phi \\ \cos\psi\sin\theta\cos\phi + \sin\psi\sin\phi & \sin\psi\sin\theta\cos\phi - \cos\psi\sin\phi & \cos\theta\cos\phi \end{bmatrix},$$

and a dynamic model can be defined as $$\ddot{x} = \frac{1}{m}(\cos\psi\sin\theta\cos\phi + \sin\psi\sin\phi)U_1 + \frac{A_x}{m},$$

$$\ddot{y} = \frac{1}{m}(\sin\psi\sin\theta\cos\phi + \cos\psi\sin\phi)U_1 + \frac{A_y}{m},$$

$$\ddot{z} = -g + \frac{1}{m}(\cos\theta\cos\phi) + \frac{A_y}{m},$$

where m is a mass of the four-rotor aircraft 300, g is an acceleration of gravity (9.8 km/s), and $[A_x\ A_y\ A_z]$ is an aerodynamic forces vector.

It should be noted that in an actual practice, the processing unit 150 may directly obtain a geodesic position (or a geographical position) through the satellite positioning system. In order to ensure the correct transformation of the two coordinate systems, the processing unit 150 requires to perform calibration at all the time. For example, the processing unit 150 corrects the current roll angle ψ based on the E-compass and the geomagnetic sensor, corrects the current pitch angle φ and the current yaw angle θ based on the accelerometer and the G-sensor. After the correct transformation of the two coordinate systems is ensured, the processing unit 150, for example, performs an integral operation based on the gyro sensor to obtain attitude information based on the on-vehicle coordinate system (i.e. the current pitch angle φ, the current yaw angle θ and the current roll angle ψ).

In step S220, the processing unit 150 adjusts a control gain through a gain adjustment function according to the current motion information, so as to control the rotors $110_1$-$110_N$ of the multiple rotors aircraft 100 through the control gain. The gain adjustment function conforms to a non-Lipschitzian characteristic. The non-Lipschitzian characteristic represents that a convergence value of the function is only zero, and the convergence value is varied after being converged to zero. To be specific, derivation of the gain adjustment function is described below. First, a translational kinetic energy $T_{trans}$ and a rotation kinetic energy $T_{rot}$ can be respectively represented by following equations (1) and (2):

$$T_{trans} = \frac{m}{2}\dot{\xi}^T\dot{\xi} \tag{1}$$

$$T_{rot} = \frac{m}{2}\dot{\eta}^T J\dot{\eta} \tag{2}$$

Where, $\zeta=(x,y,z)\in R^3$, $\eta=(\phi,\theta,\psi)\in S^3$, J is a rotation inertia matrix. A potential energy U of the four-rotor aircraft 300 in FIG. 3A can be represented by a following equation (3):

$$U = mgz \tag{3}$$

A Lagrangian function can be represented in a following equation (4):

$$\frac{d}{dt}\frac{\partial L}{\partial \dot{q}} - \frac{\partial L}{\partial q} = F \tag{4}$$

Where, $q=[\phi\theta\psi]'$. By applying the above equations (1)-(3) to $L(q,\dot{q})$, a following equation (5) is obtained:

$$L(q,\dot{q}) = T_{trans} + T_{rot} - U = \frac{m}{2}\dot{\xi}^T\dot{\xi} + \frac{m}{2}\dot{\eta}^T J\dot{\eta} - mgz, \tag{5}$$

-continued and $$F = \begin{bmatrix} F_\zeta \\ \tau \end{bmatrix} \quad (6)$$

Where, $$F_\zeta = \begin{bmatrix} \cos\theta\cos\psi & \sin\psi\sin\theta & -\sin\theta \\ \cos\psi\sin\theta\sin\phi & \sin\psi\sin\theta\sin\phi + \cos\psi\cos\phi & \cos\theta\cos\phi \\ \cos\psi\sin\theta\cos\phi + \sin\psi\sin\phi & \sin\psi\sin\theta\cos\phi - \cos\psi\sin\phi & \cos\theta\cos\phi \end{bmatrix} \begin{bmatrix} 0 \\ 0 \\ f_1 + f_2 + f_3 + f_4 \end{bmatrix}, \quad (7)$$

and $$\tau = \begin{bmatrix} \tau_\phi \\ \tau_\theta \\ \tau_\psi \end{bmatrix} = \begin{bmatrix} (f_1 - f_3)l \\ (f_4 - f_2)l \\ (-f_1 - f_3 + f_2 + f_4) \end{bmatrix} \quad (8)$$

Where, $f_1$, $f_2$, $f_3$, $f_4$ are respectively thrust forces (corresponding to a $B_3$ axis direction of the on-vehicle coordinate system, or a direction perpendicular to the blades of the rotors $310_1$, $310_2$, $310_3$, $310_4$) of the rotors $310_1$, $310_2$, $310_3$, $310_4$, l is a length from a motor shaft to a mass center.

By organizing the above equations, following equations (9) and (10) are obtained:

$$m\ddot{\xi} = (f_1 + f_2 + f_3 + f_4) \begin{bmatrix} -\sin\theta \\ \cos\theta\sin\phi \\ \cos\theta\cos\phi \end{bmatrix} + \begin{bmatrix} 0 \\ 0 \\ mg \end{bmatrix} \quad (9)$$

$$J\dot{\eta} = -C(\eta, \dot{\eta})\eta + \tau \quad (10)$$

Where, $C(\eta, \dot{\eta})$ is a Coriolis term.

In order to overcome a rotation moment produced when the four sets of rotors $310_1$, $310_2$, $310_3$, $310_4$ simultaneously rotate, the four-rotor aircraft 300 may adopt a symmetric rotation direction design (for example, rotation directions $M_1$, $M_2$, $M_3$, $M_4$ of the rotors $310_1$, $310_2$, $310_3$, $310_4$ in FIG. 3A). Based on a special design, an influence of the rotation moment on the four-rotor aircraft 300 produced when the rotors $310_1$, $310_2$, $310_3$, $310_4$ simultaneously rotate can be decreased. If the four-rotor aircraft 300 is required to have a variation in the current pitch angle φ, the thrust forces are designed to satisfy $f_1 > f_3$ or $f_1 < f_3$, and meanwhile a position of the four-rotor aircraft 300 on the $E_x$ axis of the geodesic coordinates is also changed (as shown in FIG. 4A). If the four-rotor aircraft 300 is required to have a variation in the current yaw angle θ, the thrust forces are designed to satisfy $f_4 > f_2$ or $f_4 < f_2$, and meanwhile a position of the four-rotor aircraft 300 on the $E_y$ axis of the geodesic coordinates is also changed (as shown in FIG. 4B). FIG. 4C presents a symmetric thrust force to produce a variation in the current roll angle ψ, and meanwhile a height of the aircraft is changed. Therefore, by changing an attitude of the aircraft, a flight direction of the aircraft is changed, and meanwhile the change of the attitude of the aircraft causes a change in a direction and a magnitude of the thrust force.

Therefore, deduced according to a robust adaptive control in collaboration with the non-Lipschitzian characteristic (i.e. the finite time is converged to zero), it is known that in the technique of the multiple rotors aircraft, a position control is a rather important link. A main purpose of the position control is to control the current position of the multiple rotors aircraft 100 to move to a target position ($x_d$, $y_d$, $z_d$) within a certain time. Since the processing unit 150 is required to calculate target attitude parameters (a target pitch angle $θ_d$, a target yaw angle $φ_d$, a target roll angle $ψ_d$) required by the multiple rotors aircraft 100 according to the required target position during the calculation process, so as to drive the multiple rotors aircraft 100 to move to the target position, (to facilitate description, the four-rotor aircraft 300 of FIG. 3A is taken as an example for description) each axis acceleration can be defined as a following equation (11):

$$\begin{bmatrix} \ddot{x} \\ \ddot{y} \\ \ddot{z} \end{bmatrix} = m^{-1}b \begin{bmatrix} (\Omega_1^2 + \Omega_2^2 + \Omega_3^2 + \Omega_4^2)\theta_d \\ (\Omega_1^2 + \Omega_2^2 + \Omega_3^2 + \Omega_4^2)\phi_d \\ (\Omega_1^2 + \Omega_2^2 + \Omega_3^2 + \Omega_4^2)\cos\theta\cos\phi \end{bmatrix} + \begin{bmatrix} m^{-1}b(\Omega_1^2 + \Omega_2^2 + \Omega_3^2 + \Omega_4^2)\tilde{H}_x \\ m^{-1}b(\Omega_1^2 + \Omega_2^2 + \Omega_3^2 + \Omega_4^2)\tilde{H}_y \\ -g \end{bmatrix} \quad (11)$$

Where, $\Omega_1$, $\Omega_2$, $\Omega_3$, $\Omega_4$ are respectively rotation speeds of the four sets of rotors in the four-rotor aircraft 300, b is a frame related length coefficient, and $\tilde{H}_x$, $\tilde{H}_y$ are respectively defined as following equations (12), (13):

$$\tilde{H}_x = -\theta_d + \cos\psi \sin\theta \cos\phi + \sin\psi \sin\phi \quad (12)$$

$$\tilde{H}_y = -\phi_d + \sin\psi \sin\theta \cos\phi - \cos\psi \sin\phi \quad (13)$$

In order to ensure the multiple rotors aircraft 100 to fly to the target position, a position tracking trajectory error function is defined as a following equation (14):

$$S_\zeta = \dot{e}_\zeta + k_\zeta e_\zeta \quad (14)$$

Where, $S_{70} = [S_x \ S_y \ S_z] = [\dot{e}_x + k_x e_x, \dot{e}_y + k_y e_y, \dot{e}_z + k_z e_z]$ and $e_\zeta = [e_x \ e_y \ e_z]^T = [x - x_d \ y - y_d \ z - z_d]^T$, and $$k_\xi = \begin{bmatrix} k_x & 0 & 0 \\ 0 & k_y & 0 \\ 0 & 0 & k_z \end{bmatrix},$$

$k_x$, $k_y$, and $k_z$ are control coefficients (real numbers).

According to the position tracking trajectory error function (14), it is known that when $S_\zeta = 0$, it represents that the error dynamically reaches a sliding surface, and such result is similar to a variable structure system well known by those skilled in the art, and each time when the error reaches the sliding surface to make $S_\zeta = 0$, the tracking trajectory error is ensured to be zero, so as to achieve an effect of position control.

Then, the target position $\zeta_d(t)$ is set as a bounded function, and a differential of the target portion (i.e. the target speed) $\zeta_d^{(i)}(t) \in R$, i=1,2,3 is bounded and conforms to $\zeta_d^{(i)}(t) \in L_\infty$.

It should be noted that a main design purpose of the position control is to make the current position of the aircraft to reach the target position, i.e.

$$\lim_{t \to \infty} \|e_\xi\| = 0.$$

Therefore, a primary condition is to ensure the processing unit 150 to obtain the current position of the multiple rotors aircraft 100 (i.e. the step S210). Then, the processing unit 150 defines an error function (15) as follows:

$$\dot{S}_\xi = \tilde{U}_1 bm^{-1} \begin{bmatrix} \theta_d + \tilde{H}_x \\ \phi_d + \tilde{H}_y \\ \cos\theta\cos\phi \end{bmatrix} + \begin{bmatrix} -\ddot{x}_d + k_x\dot{e}_x \\ -\ddot{y}_d + k_y\dot{e}_y \\ -\ddot{z}_d + k_z\dot{e}_z \end{bmatrix} + \begin{bmatrix} 0 \\ 0 \\ -g \end{bmatrix}, \quad (15)$$

and defines $\tilde{U}_1$ as the main thrust force of the multiple rotors aircraft 100. For example, the main thrust force of the four-rotor aircraft 300 of FIG. 3A is $\tilde{U}_1 = \Omega_1^2 + \Omega_2^2 + \Omega_3^2 + \Omega_4^2$. The error function (15) conforms to the non-Lipschitzian characteristic.

It should be noted that rules of a non-Lipschitzian autonomous system include following theorems. Considering that the autonomous system $\dot{x}=f(x)$, where $f:D \to R^n$ is non-Lipschitzian continuous on an origin open neighborhood $D \subseteq R^n$ of an origin of $R^n$. The origin of $\dot{x}=f(x)$ is a finite time convergence if there exists an origin $N \subseteq D$ of the origin and a function $T_x:N\setminus\{0\} \to (0, \infty)$ calls a setting time function such that every solution a trajectory $x(t,x_0)$ of $\dot{x}=f(x)$ starting from an initial point $x_0 \in [0, T_x(x_0))$, and $$\lim_{t \to T_x(x_0)} x(t, x_0) = 0, .$$

In other words, a condition of a differential equation being differentiable is that it is continuous and smooth. If the unique solution to the differential equation is 0 and continuous but not smooth, it is undifferentiable. However, if the solution to the differential equation does not vary after reaching 0, it indicates that the differential equation converges to 0.

Then, based on height control, the main thrust force can be modified to a following equation (16):

$$\tilde{U}_1 = \frac{1}{\cos\theta\cos\phi}(g + \ddot{z}_d - k_z\dot{e}_z - K_z S_z) \forall |\theta| < \pi/2, |\phi| < \pi/2, \quad (16)$$

Where, $K_z$ is an aerodynamic damping coefficient (a real number).

Regarding the control gains for the $E_x$ axis and the $E_y$ axis, the gain adjustment functions (17), (18), (19) can be deduced based on the non-Lipschitzian characteristic, a Kalman filter and a sliding mode observer:

$$\dot{h}_x = -h_x^{(1/2n+1)}[\tilde{U}_1(-\theta_d + \cos\psi\sin\theta\cos\phi + \sin\psi\sin\phi)S_x] \quad (17)$$

$$\dot{h}_y = -h_y^{(1/2n+1)}[\tilde{U}_1(-\phi_d + \sin\psi\sin\theta\cos\phi - \cos\psi\sin\phi)S_y] \quad (18)$$

$$\dot{h}_i = \begin{cases} -h_i^{(1/2n+1)}\Theta_i, & h_i \neq 0, i = x, y \\ \sigma, & h_i = 0 \end{cases} \quad (19)$$

Where $h_x$, $h_y$ are the control gains, n is hierarchy, g is the acceleration of gravity, $\Theta_i = \tilde{U}_1 \tilde{H}_i S_i$, i is x or y, and $\sigma$ is a small constant.

It should be noted that the processing unit 150 changes the control gains by adjusting the hierarchy n, so as to adjust the convergence time of the gain adjustment functions (17) and (18).

Then, the processing unit 150 adjusts the target attitude parameters through attitude estimation functions according to the current motion information and the control gains (i.e. $h_x$, $h_y$), where the attitude estimation functions (20), (21) are defined as follows:

$$\theta_d = \frac{1}{\tilde{U}_1}(-K_x S_x + \ddot{x}_d - k_x\dot{e}_x - |h_x|S_x) \quad (20)$$

$$\phi_d = \frac{1}{\tilde{U}_1}(-K_y S_y + \ddot{y}_d - k_y\dot{e}_y - |h_y|S_y) \quad (21)$$

In other words, the processing unit 150 adjusts the control gains according to the gain adjustment functions (17), (18), (19), so as to control each set of the rotors 110₁-110ᵣ, such that a flight attitude of the multiple rotors aircraft 100 is adjusted to the target pitch angle $\theta_d$ and the target yaw angle $\phi_d$, and the multiple rotors aircraft 100 may accurately fly to the target position.

$\{t_v\}_{v=1}^\infty$ is conformed to a measure zero condition, such that $h_i(t_v)=0$, v=1,2,3, . . . ∞. Moreover, through theoretical analysis of stability conditions of Lyapunov and Kurzweil theory, it is learned that based on the equations (15)-(20), an error of position control of the multiple rotors aircraft 100 may reach an asymptotically stable condition. On the other hand, in the aforementioned descriptions, the derivation of the four-rotor aircraft is taken as an example for descriptions, and the multiple rotors aircraft with other number of the rotors can also be derived to calculate the corresponding error function (15), the gain adjustment functions (17), (18), (19) and the attitude estimation functions (20), (21).

Figure 5:
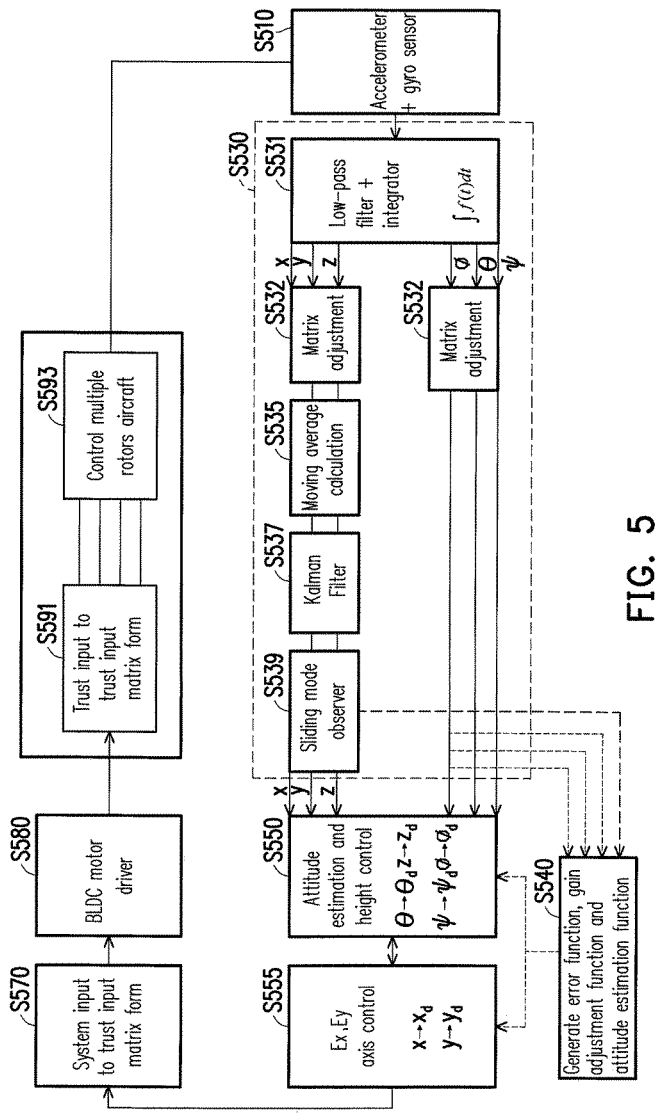
FIG. 5 is an example of a control flow according to an embodiment of the invention.

FIG. 5 is an example of a control flow according to an embodiment of the invention. Referring to FIG. 5, the control method of the present embodiment is adapted to the multiple rotors aircraft 100 of FIG. 1, in the following description, the control method of the present embodiment is described with reference of various components and modules of the multiple rotors aircraft 100. The flow of the control method can be adjusted according to an actual requirement, which is not limited to the flow shown in FIG. 5.

The processing unit 150 obtains the current motion information (for example, an acceleration and an angular acceleration of each axis) through the accelerometer and the gyro sensor in the inertial navigation element 130 (step S510), and performs a transformation procedure on the current motion information (step S530). The processing unit 150 processes the value of the current motion information through a low-pass filter to obtain a required value, and further calculates through an integrator to obtain current speeds along three axial directions ($\dot{x}$` $\dot{y}$` $\dot{z}$), the current pitch angle $\phi$, the current yaw angle $\theta$ and the current roll angle $\psi$ (step S531). The processing unit 150 performs correction, transformation and estimation on the current speed ($\dot{x}$` $\dot{y}$` $\dot{z}$) through matrix adjustment (step S532), moving average calculation (step S535), a Kalman Filter (step S537) and a sliding mode observer (step S539) to calculate the current position (x,y,z). On the other hand, the processing unit 150 performs matrix adjustment on the current pitch angle $\phi$, the current yaw angle $\theta$ and the current roll angle $\psi$ (step S532) to transform each of the Euler angle coefficients into the geodesic coordinate system. Then, the processing unit 150 applies the above results to the equations (15)-(20) to respectively generate (for example, the error function (15), the gain adjustment functions (17), (18),

(19) and the attitude estimation functions (20), (21)) (step S540), such that the current position (x,y,z) is conformed to the target position $(x_d,y_d,z_d)$ and the current attitude parameters (i.e. the current pitch angle $\phi$, the current yaw angle $\theta$ and the current roll angle $\psi$) are conformed to the target attitude parameters (i.e. the target pitch angle $\theta_d$, the target yaw angle $\phi_d$ and the target roll angle $\psi_d$) (steps S550, S555). The processing unit 150 transforms a system input into a trust input matrix form (step S570) to drive a brushless DC motor driver (step S580). Then, the processing unit 150 transforms a trust input into the trust input matrix form (step S591) to control the multiple rotors aircraft 100 (step S593). The aforementioned operation flow is repeatedly performed to converge the error value between the current position and the target position to zero.

It should be noted that according to a different design requirement, the transformation procedure of the step S530 can be varied along with different algorithms, and the embodiment of the invention is not limited to the flow of FIG. 5.

In summary, in the multiple rotors aircraft and the control method thereof provided by the invention, the inertial navigation element is applied to measure the flight attitude of the multiple rotors aircraft (for example, the current pitch angle $\phi$, the current yaw angle $\theta$ and the current roll angle $\psi$), and the error function based on the on-Lipschitzian characteristic is adopted to derive the attitude estimation functions and the gain adjustment functions, so as to adjust the control gains and the flight attitude. In this way, the error value between the current position and the target position may reach a fast convergence effect according to embodiment of the invention, so as to provide a robust adaptive control system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A control method, adapted to a multiple rotors aircraft, comprising:
   obtaining current motion information of the multiple rotors aircraft;
   defining an error function according to the current motion information;
   adjusting at least one control gain through a gain adjustment function according to the current motion information, so as to control at least one rotor of the multiple rotors aircraft according to the at least one control gain; and
   adjusting the at least one target attitude parameter through an attitude estimation function according to the current motion information and the at least one control gain, wherein the error function and the gain adjustment function conform to a non-Lipschitzian characteristic.

2. The control method as claimed in claim 1, wherein the non-Lipschitzian characteristic represents that a convergence value of a function is only zero, and the convergence value is not varied after being converged to zero.

3. The control method as claimed in claim 1, wherein the current motion information comprises a current pitch angle, a current yaw angle and a current roll angle, and the gain adjustment function is $\dot{h}_x = -h_x^{(1/2\,n+1)}[\tilde{U}_1(-\theta_d+\cos\psi\sin\theta\cos\phi+\sin\psi\sin\phi)S_x]$
$\dot{h}_y = -h_y^{(1/2n+1)}[\tilde{U}_1(-\phi_d+\sin\psi\sin\theta\cos\phi-\cos\psi\sin\phi)S_y]$,
where $h_x$, $h_y$ are the at least one $$h_i = \begin{cases} -h_i^{(1/2n+1)}\Theta_i, & h_i \neq 0, i = x, y \\ \sigma, & h_i = 0 \end{cases}$$

control gain, $$\tilde{U}_1 = \frac{1}{\cos\theta\cos\phi}(g + \ddot{z}_d - k_z\dot{e}_z - K_z S_z)\forall\, |\theta| < \pi/2, |\phi| < \pi/2,$$

$\theta_d$ is a target pitch angle in at least one target attitude parameter, $\phi_d$ is a target yaw angle in the at least one target attitude parameter, $\psi$ is the current roll angle, $\theta$ is the current pitch angel, $\phi$ is the current yaw angle, $S_x=\dot{e}_x+k_x e_x$, $e_x=x-x_d$, $S_y=\dot{e}_y+k_y e_y$, $e_y=x-x_d$, $S_z=\dot{e}_z+k_z e_z$, $e_z=z-z_d$, (x,y,z) is a current position, $(x_d,y_d,z_d)$ is a target position, $k_x$, $k_y$, and $k_z$ are control coefficients, $K_z$ is an aerodynamic damping coefficient, n is hierarchy, g is the acceleration of gravity, $\Theta_i=\tilde{U}_1\tilde{H}_i S_i$, $\tilde{H}_x=-\theta_d+\cos\psi\sin\theta\cos\phi+\sin\psi\sin\phi$, $\tilde{H}_y=-\phi_d+\sin\psi\sin\theta\cos\phi-\cos\psi\sin\phi$, and $\sigma$ is a constant.

4. The control method as claimed in claim 3, wherein the attitude estimation function is $$\theta_d = \frac{1}{\tilde{U}_1}(-K_x S_x + \ddot{x}_d - k_x\dot{e}_x - |h_x|S_x),$$

$$\phi_d = \frac{1}{\tilde{U}_1}(-K_y S_y + \ddot{y}_d - k_y\dot{e}_y - |h_y|S_y).$$

5. The control method as claimed in claim 3, wherein the error function is $$\dot{S}_\xi = \tilde{U}_1 bm^{-1}\begin{bmatrix}\theta_d + \tilde{H}_x \\ \phi_d + \tilde{H}_y \\ \cos\theta\cos\phi\end{bmatrix} + \begin{bmatrix}-\ddot{x}_d + k_x\dot{e}_x \\ -\ddot{y}_d + k_y\dot{e}_y \\ -\ddot{z}_d + k_z\dot{e}_z\end{bmatrix} + \begin{bmatrix}0 \\ 0 \\ -g\end{bmatrix},$$

and b is a length constant.

6. The control method as claimed in claim 3, wherein the current motion information further comprises the current position, the step of obtaining the current motion information of the multiple rotors aircraft comprises:
   obtaining the current position, the current pitch angle, the current yaw angle and the current roll angle through at least one inertial navigation element.

7. A multiple rotors aircraft, comprising:
   at least one rotor, respectively controlled by at least one control gain;
   at least one inertial navigation element, obtaining current motion information of the multiple rotors aircraft; and
   a processing unit, coupled to the at least one rotor and the at least one inertial navigation element, obtaining the current motion information of the multiple rotors aircraft through the at least one inertial navigation element, defining an error function according to the current motion information, adjusting the at least one control gain through a gain adjustment function according to the current motion information, and adjusting the at least one target attitude parameter through an attitude estimation function according to the current motion information and the at least one control gain, wherein the error function and the gain adjustment function conform to a non-Lipschitzian characteristic.

8. The multiple rotors aircraft as claimed in claim 7, wherein the non-Lipschitzian characteristic represents that a convergence value of a function is only zero, and the convergence value is not varied after being converged to zero.

9. The multiple rotors aircraft as claimed in claim 7, wherein the current motion information comprises a current pitch angle, a current yaw angle and a current roll angle, and the gain adjustment function is $\dot{h}_x = -h_x^{(1/2\ n+1)}[\tilde{U}_1(-\theta_d + \cos\psi \sin\theta \cos\phi + \sin\psi \sin\phi)S_x]$
$\dot{h}_y = -h_y^{(1/2n+1)}[\tilde{U}_1(-\phi_d + \sin\psi \sin\theta \cos\phi - \cos\psi \sin\phi)S_y]$, where $h_x$, $h_y$ are the at least one $$h_i = \begin{cases} -h_i^{(1/2n+1)}\Theta_i, & h_i \neq 0, i = x, y \\ \sigma, & h_i = 0 \end{cases}$$

control gain, $$\tilde{U}_1 = \frac{1}{\cos\theta\cos\phi}(g + \ddot{z}_d - k_z\dot{e}_z - K_zS_z) \forall\ |\theta| < \pi/2, |\phi| < \pi/2,,$$

$\theta_d$ is a target pitch angle in at least one target attitude parameter, $\phi_d$ is a target yaw angle in the at least one target attitude parameter, $\psi$ is the current roll angle, $\theta$ is the current pitch angel, $\phi$ is the current yaw angle, $S_x = \dot{e}_x + k_x e_x$, $e_x = x - x_d$, $S_y = \dot{e}_y + k_y e_y$, $e_y = x - x_d$, $S_z = \dot{e}_z + k_z e_z$, $e_z = z - z_d$, $(x,y,z)$ is a current position, $(x_d, y_d, z_d)$ is a target position, $k_x$, $k_y$, and $k_z$ are control coefficients, $K_z$ is an aerodynamic damping coefficient, n is hierarchy, g is the acceleration of gravity, $\Theta_i = \tilde{U}_1 \tilde{H}_i S_i$, $\tilde{H}_x = -\theta_d + \cos\psi \sin\theta \cos\phi + \sin\psi \sin\phi$, $\tilde{H}_y = -\phi_d + \sin\psi \sin\theta \cos\phi - \cos\psi \sin\phi$, and $\sigma$ is a micro constant.

10. The multiple rotors aircraft as claimed in claim 9, wherein the attitude estimation function is $$\theta_d = \frac{1}{\tilde{U}_1}(-K_x S_x + \ddot{x}_d - k_x \dot{e}_x - |h_x|S_x),$$

$$\phi_d = \frac{1}{\tilde{U}_1}(-K_y S_y + \ddot{y}_d - k_y \dot{e}_y - |h_y|S_y).$$

11. The multiple rotors aircraft as claimed in claim 9, wherein the error function is $$\dot{S}_\xi = \tilde{U}_1 bm^{-1} \begin{bmatrix} \theta_d + \tilde{H}_x \\ \phi_d + \tilde{H}_y \\ \cos\theta\cos\phi \end{bmatrix} + \begin{bmatrix} -\ddot{x}_d + k_x\dot{e}_x \\ -\ddot{y}_d + k_y\dot{e}_y \\ -\ddot{z}_d + k_z\dot{e}_z \end{bmatrix} + \begin{bmatrix} 0 \\ 0 \\ -g \end{bmatrix},$$

and b is a length constant.

* * * * *